United States Patent
Qin et al.

(10) Patent No.: US 9,354,474 B2
(45) Date of Patent: May 31, 2016

(54) ARRAY SUBSTRATE AND LIQUID CRYSTAL DISPLAY DEVICE

(71) Applicant: BOE TECHNOLOGY GROUP CO., LTD., Beijing (CN)

(72) Inventors: Guangkui Qin, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 85 days.

(21) Appl. No.: 14/077,745

(22) Filed: Nov. 12, 2013

(65) Prior Publication Data

US 2014/0132907 A1 May 15, 2014

(30) Foreign Application Priority Data

Nov. 13, 2012 (CN) .......................... 2012 1 0454655

(51) Int. Cl.
*G02F 1/1343* (2006.01)

(52) U.S. Cl.
CPC .................... *G02F 1/134363* (2013.01); *G02F 2001/134318* (2013.01)

(58) Field of Classification Search
CPC .............. G02F 1/134363; G02F 2001/134318; G02F 1/1368; G02F 1/1335; G02F 1/1333; G02F 1/133345; G02F 1/136286; G02F 1/136227; G02F 1/134309; G02F 1/13439; G02F 1/136213; G02F 1/134336; G02F 1/133514; G02F 1/1362; G02F 1/1343; G02F 2001/13629; G02F 2001/133357; G02F 2201/123; H01L 21/76877; H01L 27/3262; H01L 27/3276; G09G 2300/0426; G09G 2300/0478; G09G 2300/08; G09G 3/3648; G09G 3/3677
USPC ........ 349/43, 42, 138, 106, 143, 139, 38, 141
See application file for complete search history.

(56) References Cited

U.S. PATENT DOCUMENTS

2004/0109122 A1* 6/2004 Kumagawa ....... G02F 1/134363
349/143
2011/0080547 A1* 4/2011 Matsumori et al. ........... 349/124

FOREIGN PATENT DOCUMENTS

JP 2009181091 A 8/2009

OTHER PUBLICATIONS

First Chinese Office Action Appln. No. 201210454655.7; Dated Sep. 22, 2014.
Second Chinese Office Action dated Feb. 27, 2015; Appln. No. 201210454655.7.
Third Chinese Office Action dated Aug. 6, 2015; Appln. No. 201210454655.7.

* cited by examiner

*Primary Examiner* — Thoi Duong
(74) *Attorney, Agent, or Firm* — Ladas & Parry LLP

(57) ABSTRACT

An embodiment of the present invention provides an array substrate comprising a plurality of pixel units, each of the pixel units including a thin film transistor and a insulating layer, wherein a first pixel electrode and a first common electrode are disposed on an upper surface of the insulating layer, a second common electrode aligned to the first common electrode and a second pixel electrode aligned to the first common electrode are disposed on a lower surface of the insulating layer.

10 Claims, 1 Drawing Sheet

ARRAY SUBSTRATE AND LIQUID CRYSTAL DISPLAY DEVICE

FIELD OF THE INVENTION

Embodiments of the present invention relate to an array substrate and a liquid crystal display device.

BACKGROUND

For a liquid crystal display device, since light from a light source for displaying images already has certain directivity while exiting the liquid crystal panel after being refracted and reflected, color distortion may occur when viewing beyond certain range of viewing angle. Therefore, viewing angle is an important parameter for evaluating performance of a liquid crystal display device. Viewing angle is the maximum angle at which a display can be viewed with acceptable visual performance. The viewing angle for a liquid crystal display device has two aspects, i.e., a horizontal viewing angle and a vertical viewing angle. A larger viewing angle means a larger displaying scope capable of being viewed with acceptable visual performance. The viewing angle for a traditional liquid crystal display device is typically 120°, which is always limiting the display performance of the liquid crystal display device.

In order to realize a wide visual angle display of a liquid crystal display device, IPS (In-Plane-Switching) technology has been proposed. The electrode structure in an existing IPS mode panel is shown in FIG. 1. In contrast to a liquid crystal panel wherein electrodes are arranged on both upper and bottom substrate at opposite sides of a liquid crystal layer, the most significant feature of an IPS mode panel lies in that pixel electrodes 3 and common electrodes 4 are both formed on the same surface of a bottom substrate 1 constituting a TFT (Thin Film Transistor) substrate, while no electrode is formed on the upper substrate 2 constituting a CF (Color Filter) substrate, However, since electrodes are arranged on the same plane, liquid crystal molecules are always parallel to the screen in any cases, which would reduce the aperture ratio and the light transmission efficiency. Therefore, when IPS is applied to large size liquid crystal display devices such as liquid crystal TVs, more backlights are required, which increases the structure complexity of backlight module and the cost of the liquid crystal display devices.

SUMMARY

An embodiment of the present invention provides an array substrate comprising a plurality of pixel units, each of the pixel units including a thin film transistor and a insulating layer, wherein a first pixel electrode and a first common electrode are disposed on an upper surface of the insulating layer, a second common electrode aligned to the first common electrode and a second pixel electrode aligned to the first common electrode are disposed on a lower surface of the insulating layer.

In an example, in an energized state, the first and second pixel electrode have a first electric potential, and the first and second common electrode have a second electric potential different from the first electric potential.

In an example, the insulating layer is used as the gate insulating layer of the thin film transistor.

In an example, the first and second pixel electrodes and the first and second common electrodes are all of strip shape.

In an example, wherein the first pixel electrode and the second pixel electrode are electrically connected with each other, and the first common electrode and the second common electrode are electrically connected with each other.

In an example, the first pixel electrode and the second pixel electrodes are electrically connected through a first pixel electrode connecting line and a first through hole via disposed above the first pixel electrode connecting line, the first common electrodes and the second common electrodes are electrically connected through a second pixel electrode connecting line and a second through hole via disposed above the second pixel electrode connecting line, the first and second pixel electrode connecting line are located on the upper and lower sides of the insulating layer, respectively.

In an example, the first pixel electrode and the second common electrode have equal width, and the second pixel electrode and the second common electrode have equal width.

In an example, the width of the first pixel electrode and the first common electrode is less than that of the second pixel electrode and the second common electrode.

In an example, wherein the first pixel electrode is located at the center of the second common electrode, and the first common electrodes is located at the center of the second pixel electrode.

Another embodiment of the present invention provides a liquid crystal display device including the array substrate described above, a counter substrate and a liquid crystal layer sandwiched between said array substrate and said counter substrate.

In one example, said counter substrate is a color filter substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION OF THE PREFERRED EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

One of the technical problems to be solved by the embodiments of the present invention is to improve the aperture ratio, the light transmission efficiency and the response speed of a multi-dimensional electric field liquid crystal display device at a low cost.

First Embodiment

The first embodiment provides an array substrate for a multi-dimensional electric field liquid crystal display device.

Figure 1:
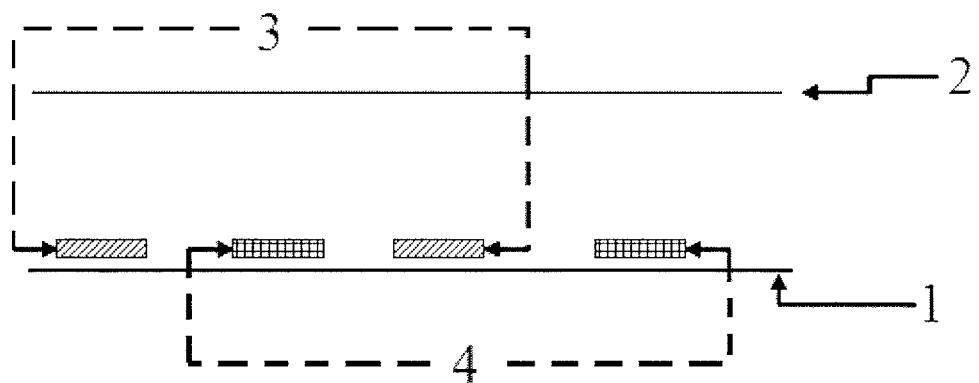
FIG. 1 is a schematic diagram of an electrode arrangement in an existing IPS mode panel.
Figure 2:
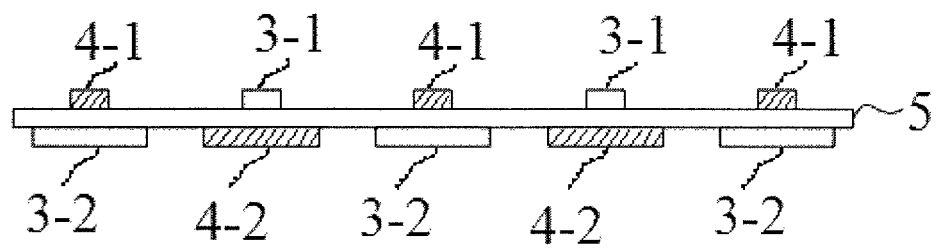
FIG. 2 is a schematic cross sectional view showing an electrode arrangement adopted by an array substrate in accordance with an embodiment of the present invention.
Figure 3:
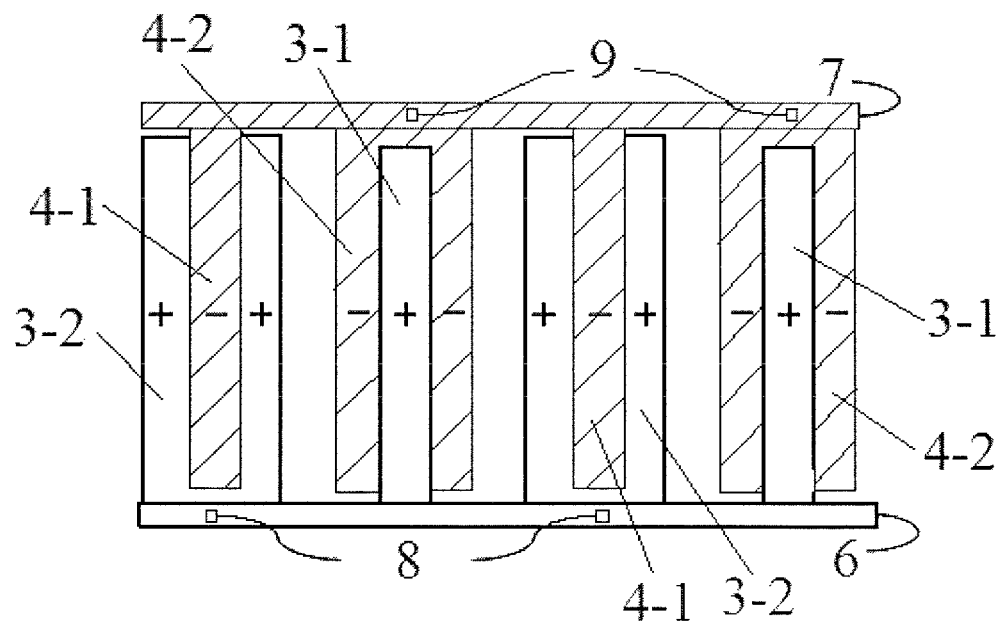
FIG. 3 is a schematic plan view showing an electrode arrangement adopted by an array substrate in accordance with an embodiment of the present invention.

The array substrate includes a base substrate (not shown) and a plurality of pixels units formed on the base substrate. Each of the pixel units are provided with a thin film transistor. In each of the pixel units, a gate insulating layer 5, a common electrode and a pixel electrode is disposed correspondingly. The common electrode and pixel electrode used in a pixel unit of the array substrate provided by the present embodiment for example comprises a layout as shown in FIG. 2. The pixel electrode used in the pixel unit of the array substrate for example has first pixel electrodes 3-1 and second pixel electrodes 3-2, and the common electrode used in the pixel unit of the array substrate for example comprises first common electrodes 4-1 and second common electrodes 4-2. The first common electrodes 4-1 and the first pixel electrodes 3-1 are alternately disposed on a surface, such as the upper surface, of the gate insulating layer 5. The first pixel electrode 3-1 and the first common electrode 4-1 adjacent to each other are spaced apart. The second common electrodes 4-2 and the second pixel electrodes 3-2 are alternately disposed on the opposite surface, such as the lower surface, of the gate insulating layer 5. The second common electrodes 4-2 and the second pixel electrodes 3-2 adjacent to each other are spaced apart. The first pixel electrodes 3-1 located on the upper surface are aligned to the second common electrodes 4-2 located on the lower surface, respectively, in the direction substantially vertical to the gate insulating layer 5. Similarly, the first common electrode 4-1 located on the upper surface are aligned to the second pixel electrode 3-2 located on the lower surface, respectively, in the direction substantially vertical to the gate insulating layer 5. In an energized state, all the first and the second pixel electrodes have a first electric potential, while all the first and second common electrodes have a second electric potential which is different from the first electric potential. In the energized state example as shown in FIG. 3, all the first and second pixel electrodes have a positive electric potential, while all the first and second common electrodes have a negative electric potential. Or course, in another energized state example, all the first and second pixel electrodes may have a negative electric potential, while all the first and second common electrodes have a positive electric potential.

In the embodiment of the present invention, on the one hand, since the first pixel electrodes and the first common electrodes are alternately arranged on the upper surface of the gate insulating layer 5 and the second pixel electrodes and the second common electrodes are alternately arranged on the upper surface of the gate insulating layer 5, horizontal electric fields may be formed between adjacent pixel electrode and common electrode on the same surface while being energized; on the other hand, since the pixel electrodes and the common electrodes located on opposite surfaces of the gate insulating layer are disposed overlap each other, fringe electric field may be formed between corresponding pixel electrodes and common electrodes on opposite surfaces of the gate insulating layer while being energized. Therefore, in addition to the advantages of IPS mode, the array substrate having the above described arrangement of common electrodes and pixel electrodes in accordance with the present embodiment can generate an fringe electric field by common electrodes and pixel electrodes on opposite surfaces of the gate insulating layer, such that liquid crystal molecules between and right above the electrodes can be rotated within planes parallel to the substrate, hence improving the aperture ratio and transmission efficiency of the liquid crystal display device using the array substrate described above.

Further referring to the plan view of FIG. 3, the electrode structure according to the present embodiment can further includes a pixel electrode connecting line 6 and a common electrode connecting line 7 disposed on two opposite end edges of the gate insulating layer 5 respectively. Pixel electrodes including the first pixel electrode 3-1 and the second pixel electrode 3-2 disposed on different surfaces of the gate insulating layer 5 are electrically connected with the pixel electrode connecting line 6, and common electrodes including the first common electrodes 4-1 and the second common electrodes 4-2 disposed on different surfaces of the gate insulating layer 5 are electrically connected with the common electrode connecting line 7.

In an example, the pixel electrode connecting line 6 and the common electrode connecting line 7 are provided on the upper and lower surfaces of the gate insulating layer 5 respectively. In addition, a first through hole via 8 and a second through hole via 9 are formed on the pixel electrode connecting line 6 and the common electrode connecting line 7, respectively. In such a case, pixel electrodes (such as the first pixel electrode 3-1 and the second pixel electrode 3-2) disposed on different surfaces of the gate insulating layer may be electrically connected by the pixel electrode connecting lines 6 and the first through hole via 8, common electrodes (such as the first common electrode 4-1 and the second common electrode 4-2) disposed on different surfaces of the gate insulating layer may be electrically connected by the common electrode connecting lines 7 and the second through hole via 9.

In an example, the first and second pixel electrodes and the first and second common electrodes in the embodiment of the present invention are all strip electrodes.

In an example, the first pixel electrodes and the first common electrodes disposed on the same surface of the gate insulating layer have equal width, and the second pixel electrodes and the second common electrodes disposed on the same surface of the gate insulating layer have equal width.

In an example, the electrodes formed on one surface of the gate insulating layer has a width greater than the electrodes formed on the other surface, as shown in FIGS. 2 and 3. Furthermore, the electrode with small width is disposed at the center of the electrode with large width via the gate insulating layer. In other words, the midlines of the projections of the corresponding pixel electrode and common electrode coincide with each other, with the insulating layer inserted therebetween.

The array substrate according to the embodiments of the present invention, due to its layout of pixel electrodes and common electrodes, can produce both the fringe electric field and the horizontal electric field while being energized. Therefore, existing driving modes, such as the single TFT-single pixel electrode driving mode for an ordinary display mode, can be applied to the array substrate according to the embodiments of the present invention. As a result, the aperture ratio and the light transmission efficiency are improved at a low cost, without increasing design difficulty and driving complexity.

Although the numbers of the first and second pixel electrodes and the first and second common electrode are formed as shown in FIG. 2 or FIG. 3 in the above embodiments of the present invention, the first and second pixel electrodes and the first and second common electrode of other numbers can be adopted in other embodiments. For example, only one first common electrode and one first pixel electrode are formed on the upper surface of the gate insulating layer 5, while only one second common electrode and one second pixel electrode are formed on the upper surface of the gate insulating layer 5. In another embodiment, the gate insulating layer 5 used in the above-described embodiments, for example, can be replaced by other insulating layer such as an interlayer insulating layer.

Second Embodiment

The present embodiment provides a liquid crystal display device including the array substrate according to any of the above-mentioned embodiments, a counter substrate and a liquid crystal layer sandwiched between the array substrate and the counter substrate.

In an example, the counter substrate is a color filter substrate.

In an example, the liquid crystal display device further includes a backlight for providing light for the array substrate.

The liquid crystal display device can be a product or component for displaying such as a liquid crystal panel, an electronic paper, an OLED panel, a liquid crystal TV, a liquid crystal display apparatus, a digital picture frame, a mobile phone, a tablet computer.

In the liquid crystal display device provided by the embodiments of the present invention, since the stripe pixel electrodes and stripe common electrodes are alternately disposed on each of the two surfaces of the gate insulating layer on the array substrate and the stripe pixel electrodes on one of the two opposite surfaces of the gate insulating layer are aligned to the stripe common electrodes on the other surface respectively, both the fringe electric field and horizontal electric field is produced between these stripe pixel electrodes and common electrodes when a voltage is applied. Furthermore, the driving mode of the liquid crystal display device provided by the embodiments of the present invention can be the same as that of an IPS mode liquid crystal display, without increasing complexity of driving circuit. Therefore, without increasing design difficulty, the aperture ratio, the light transmission efficiency and the response speed can be improved at a low cost.

Although the present invention has been described in detail with general description and specific implementations above, it is obvious for those skilled in the art that some modifications or improvements may be made to the present invention on the basis of it. Therefore, these modifications or improvements made without departing from the spirit of the present invention fall into the scope of the present invention.

What is claimed is:

1. An array substrate comprising a plurality of pixel units, each of the pixel units including a thin film transistor and an insulating layer, wherein at least two first pixel electrodes and at least two first common electrodes are disposed on an upper surface of the insulating layer, at least two second pixel electrodes and at least two second common electrodes are disposed on a lower surface of the insulating layer, the at least two second common electrodes are aligned to the at least two first pixel electrodes respectively, the at least two second pixel electrodes are aligned to the at least two first common electrodes respectively, wherein the at least two first pixel electrodes and the at least two second pixel electrodes are electrically connected through a pixel electrode connecting line and at least two first through hole vias disposed above the pixel electrode connecting line, the at least two first common electrodes and the at least two second common electrodes are electrically connected through a common electrode connecting line and at least two second through hole vias disposed above the common electrode connecting line, wherein, vertical projections of the pixel electrode connecting line and the common electrode connecting line on the upper surface of the insulating layer do not overlap, and vertical projections of all the first and second pixel electrodes and all the first and second common electrodes on the upper surface of the insulating layer are located between the vertical projections of the pixel electrode connecting line and the common electrode connecting line on the upper surface of the insulating layer.

2. The array substrate of claim 1, wherein, the at least two first through hole vias are in one-to-one correspondence with the pixel electrodes on a side of the insulating layer opposite to the pixel electrode connecting line; the at least two second through hole vias are in one-to-one correspondence with the common electrodes on a side of the insulating layer opposite to the pixel electrode connecting line.

3. The array substrate of claim 2, wherein, the first and second pixel electrodes and the first and second common electrodes are all of straight strip shape, the pixel electrodes on the side of the insulating layer opposite to the pixel electrode connecting line are not physically connected on the side of the insulating layer, and the common electrodes on the side of the insulating layer opposite to the common electrode connecting line are not physically connected on the side of the insulating layer.

4. The array substrate of claim 1, wherein, the pixel electrode connecting line and the common electrode connecting line are located on different sides of the insulating layer, respectively.

5. The array substrate of claim 1, wherein the insulating layer is used as the gate insulating layer of the thin film transistor.

6. The array substrate of claim 1, wherein the first pixel electrode and the first common electrode have equal width, and the second pixel electrode and the second common electrode have equal width.

7. The array substrate of claim 6, wherein the width of the first pixel electrode and the first common electrode is less than that of the second pixel electrode and the second common electrode.

8. The array substrate of claim 7, wherein each of the at least two first pixel electrodes is located at a center of one of the at least second common electrode, and each of the at least two first common electrodes is located at a center of one of the at least second pixel electrode.

9. A liquid crystal display device comprising the array substrate of claim 1, a counter substrate and a liquid crystal layer sandwiched between the array substrate and the counter substrate.

10. The liquid crystal display device of claim 9, the counter substrate is a color filter substrate.

* * * * *